United States Patent
Rieke

(10) Patent No.: US 7,572,880 B2
(45) Date of Patent: Aug. 11, 2009

(54) PROCESS FOR SUBSTITUTED POLYTHIOPHENE POLYMERS

(75) Inventor: Reuben Rieke, Lincoln, NE (US)

(73) Assignee: Rieke Metals Inc., Lincoln, NE (US)

( * ) Notice: Subject to any disclaimer, the term of this patent is extended or adjusted under 35 U.S.C. 154(b) by 0 days.

(21) Appl. No.: 12/009,637

(22) Filed: Jan. 18, 2008

(65) Prior Publication Data

US 2008/0188637 A1 Aug. 7, 2008

Related U.S. Application Data

(63) Continuation of application No. PCT/US2006/027871, filed on Jul. 18, 2006.

(60) Provisional application No. 60/699,869, filed on Jul. 18, 2005.

(51) Int. Cl.
C08G 75/00 (2006.01)
C08F 28/06 (2006.01)

(52) U.S. Cl. .................. 528/380; 528/373; 528/377; 528/378; 526/256; 525/535; 524/418; 524/609

(58) Field of Classification Search ............... 528/73, 528/377, 378, 379, 380, 373; 525/417, 535, 525/536; 526/256; 524/418, 609
See application file for complete search history.

(56) References Cited

U.S. PATENT DOCUMENTS

| | | |
|---|---|---|
| 5,756,653 A | 5/1998 | Rieke |
| 6,166,172 A | 12/2000 | McCullough et al. |
| 6,602,974 B1 * | 8/2003 | McCullough et al. ......... 528/73 |
| 2004/0030091 A1 | 2/2004 | McCullough et al. |
| 2005/0080219 A1 | 4/2005 | Koller et al. |

FOREIGN PATENT DOCUMENTS

| | | |
|---|---|---|
| EP | 0402269 A1 | 12/1990 |
| JP | 2004-115695 A | 4/2004 |
| WO | WO-2007/011945 A1 | 1/2007 |
| WO | WO-2007/059838 A1 | 5/2007 |
| WO | WO-2007/146074 A1 | 12/2007 |

OTHER PUBLICATIONS

"European Application Serial No. 06787727.4, Supplemental European Search Report mailed Jan. 5, 2009", 9 pgs.
"International Application Serial No. PCT/US07/13436, International Search Report mailed Oct. 26, 2007", 3 pgs.
"International Application Serial No. PCT/US07/13436, Written Opinion mailed Oct. 26, 2007", 7 pgs.
"International Application Serial No. PCT/US2006/027871, International Search Report mailed Dec. 18, 2006", 3 pgs.
"International Application Serial No. PCT/US2006/027871, Written Opinion mailed Dec. 18, 2006", 4 pgs.
Cheng, Y.-J., et al., "Synthesizing optoelectronic heteroaromatic conjugated polymers by cross-coupling reactions", *Journal of Organometallic Chemistry*, 689(24), (2004), 4137-4148.
McCullough, R. D, et al., "The First Synthesis and New Properties of Regioregular, Head-To-Tail Coupled Polythiophenes", *Synthetic Metals*, 69, (1995), 279-282.
Von Dem Bussche-Hüennefeld, J. L., et al., "Enantioselective Preparation of *sec.* Alcohols from Aldehydes and Dialkyl Zinc Compounds, Generated in situ from Grignard Reagents, Using Substoichiometric Amounts of TADDOL-Titanates", *Tetrahedron*, 48(27), (1992), 5719-5730.

* cited by examiner

*Primary Examiner*—Duc Truong
(74) *Attorney, Agent, or Firm*—Schwegman, Lundberg & Woessner, P.A.

(57) ABSTRACT

An improved process for preparing regioregular substituted polythiophenes is described where a substituted thiophene having at least two leaving groups is treated with an organomagnesium halide followed by zinc chloride or bromide and the resulting reaction mixture in solution is polymerized with a Ni(II) catalyst.

21 Claims, No Drawings

PROCESS FOR SUBSTITUTED POLYTHIOPHENE POLYMERS

RELATED APPLICATIONS

This application is a continuation under 35 U.S.C. §111(a) of International Application No. PCT/US2006/027871 filed Jul. 18, 2006 and published in English as WO 2007/011945 A1 on Jan. 25, 2007, which claimed priority under 35 U.S.C. §119(e) to U.S. Application Ser. No. 60/699,869, filed Jul. 18, 2005, which applications and publication are incorporated herein by reference.

FIELD OF THE INVENTION

The invention relates to an improved process for making substituted polythiophene polymers having high regioselectivity in a more efficient and less costly manner.

BACKGROUND OF THE INVENTION

Substituted polythiophene polymers have received extensive attention in recent years due to their nonlinear optical properties, electro-conductivity and many other valuable properties. They can be used in a number of applications including electronic and optical devices, such as field-effect transistors, sensors, light-emitting diodes (LEDs), rechargeable batteries, smart cards, and non-linear optical materials. The use of these polymers for such applications has been hampered by some of the properties of these polymers, but most importantly their methods of synthesis. Conventional methods of synthesis do not create pure polymers with respect to regiospecificity, which has been recognized as playing an important, if not critical role, in determining the physical properties of conducting polymers.

U.S. Pat. No. 5,756,653 describes the first known method of providing regiospecific (regioregular) polythiophene polymers. This method employs highly reactive zinc species as precursors to the polymers which are costly and hard to handle. Furthermore, the polymerization reaction may take up to 5 days to complete.

U.S. Pat. No. 6,166,172 describes a method of forming regioregular poly-(3-substituted)thiophenes by combining a soluble thiophene having at least two leaving groups with an organomagnesium reagent at reflux temperature to form a regiochemical isomer intermediate and adding an effective amount of Ni(II) catalyst to initiate a polymerization reaction at reflux temperatures. The reaction is said to yield major amounts of regioregular polythiophene.

Thus, there still remains a need for better synthetic methods for manufacturing substituted polythiophene polymers having high amounts of regioregular polymer. Also needed are devices with high purity regioregular polythiophene polymer components for improved ease of manufacture and device operation.

SUMMARY OF THE INVENTION

The present invention provides an improved process of preparing a poly-(3-substituted)thiophene with greater than about 95% regioregularity which includes combining a 3-substituted thiophene having at least two leaving groups with an organomagnesium halide between about 0° C. and ambient or room temperature in an inert solvent followed by treating the solution with zinc chloride or bromide at ambient or room temperature; the resulting solution is added to a Ni(II) catalyst in the same solvent to initiate polymerization at about ambient or room temperature to afford the desired polymer with greater than about 95% regioregularity.

The entire process is carried out without isolation of any intermediates.

In one embodiment, the present invention provides an improved process of preparing a polymer of the formula I:

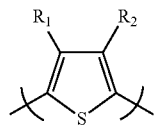

wherein $R_1$ and $R_2$ are each independently —H, -alkyl, -aryl, -heterocycle, -cycloalkyl, -alkyl-$CO_2H$, —$(CH_2)_n$-aryl-$(CH_2)_n CO_2H$, —$(CH_2)_n$-heterocycle-$(CH_2)_n$—$CO_2H$, or —$(CH_2)_n$-cycloalkyl-$(CH_2)_n$—$CO_2H$, where n is an integer from 0 to 200, and with the proviso that only one of $R_1$ and $R_2$ is —H, comprising:

reacting a compound of the formula:

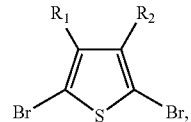

wherein $R_1$ and $R_2$ are as defined above, with an organometallic reagent of the formula R'MgX, in which X is F, Cl, Br or I, and R' is alkyl or aryl, in an inert solvent between about 0° C. and ambient temperature followed by the addition of zinc chloride or bromide to the reaction mixture at about ambient temperature;

adding the resulting solution to an effective amount of a Ni(II) catalyst in the same inert solvent at about ambient temperature, wherein the resulting polymer has greater than 95% regioregularity.

Another embodiment of the invention includes a further step where the polymers of formula I have a terminal carboxylic acid group substituted on the polythiophene polymer of converting the acid to an alkali metal salt which provides a water soluble polythiophene polymer. Advantages of these polymers are in their use and disposal for environmental reasons such as those described in co-pending application No. PCT/US2004/041914.

The advantage of the present process includes the use of a transmetallation reaction to afford an organozinc precursor which is polymerized with a nickel catalyst without the use of added energy (heat) and without need of isolating any of the intermediates. The present process also affords a higher degree of regioregular polymers than currently know methods.

The invention is also directed to a conductive polymer composed of an improved regioregular polythiophene having superior electroconductive properties. The improved polythiophene is characterized by its monomeric composition, its degree of regioregularity, and its physical properties such as its molecular weight and number average molecular weight, its polydispersity, its conductivity, its purity obtained directly from its preparatory features, as well as other properties. The improved polythiophene is characterized as well by the process for its preparation.

The invention is as well directed to a thin film of a polythiophene prepared by the methods described herein. The polythiophene film can include a dopant. In another aspect of the invention, the polythiophene film can be employed to prepare a radio frequency identification (RFID) tag, a plastic lighting device, or an organic light-emitting diode (OLED), such as in an electronic display.

DETAILED DESCRIPTION OF THE INVENTION

The present invention provides an improved process of preparing a poly-(3-substituted)thiophene with greater than about 95% regioregularity which includes combining a 3-substituted thiophene having at least two leaving groups with an organomagnesium halide between about 0° C. and ambient or room temperature in an inert solvent followed by treating the solution with zinc chloride or bromide at ambient or room temperature; the resulting solution is added to a Ni(II) catalyst in the same solvent to initiate polymerization at about ambient or room temperature to afford the desired polymer with greater than about 95% regioregularity.

The entire process is carried out without isolation of any intermediates.

In one embodiment the present invention provides a process for preparing substituted polythiophene polymers of the formula I:

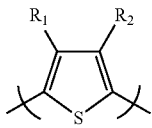

wherein $R_1$ and $R_2$ are each independently —H, -alkyl, -aryl, -heterocycle, -cycloalkyl, -alkyl-$CO_2H$, —$(CH_2)_n$-aryl-$(CH_2)_n$—$CO_2H$, —$(CH_2)_n$-heterocycle-$(CH_2)n$-$CO2H$, or —$(CH_2)_n$-cycloalkyl-$(CH_2)_n$—$CO_2H$, where n is an integer from 0 to 200, and with the proviso that only one of $R_1$ and $R_2$ is —H, comprising:

reacting a compound of the formula:

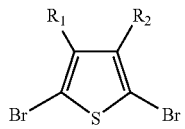

wherein $R_1$ and $R_2$ are as defined above, with an organometallic reagent of the formula R'MgX, in which X is F, Cl, Br, or I, and R' is alkyl or aryl, in an inert solvent between about 0° C. and ambient temperature followed by the addition of zinc chloride or bromide to the reaction mixture at about ambient temperature;

adding the resulting solution to an effective amount of a Ni(II) catalyst in the same inert solvent at about ambient temperature to initiate polymerization, wherein the resulting polymer has greater than 95% regioregularity.

Another embodiment converts polymers of formula I, where the polythiophene is substituted by one or more groups containing a free terminal carboxylic acid group, to an alkali metal salt of such polymers, which are water soluble.

In one embodiment, both $R_1$ and $R_2$ are -alkyl, -alkyl$CO_2H$, aryl, —$(CH_2)_n$-aryl-$(CH_2)_n CO_2H$, heterocycle, —$(CH_2)_n$-heterocycle-$(CH_2)_n CO_2H$, -cycloalkyl, or —$(CH_2)_n$-cycloalkyl-$(CH_2)_n CO_2H$. In another embodiment, either $R_1$ or $R_2$ is —H and the other of $R_1$ or $R_2$ is alkyl, -alkyl$CO_2H$, aryl, —$(CH_2)_n$-aryl-$(CH_2)_n CO_2H$, heterocycle, —$(CH_2)_n$-heterocycle-$(CH_2)_n CO_2H$, cycloalkyl, or —$(CH_2)_n$-cycloalkyl-$(CH_2)_n CO_2H$.

As used herein, certain terms have the following meanings. All other terms and phrases used in this specification have their ordinary meanings as one of skill would understand. Such ordinary meanings may be obtained by reference to technical dictionaries, such as *Hawley's Condensed Chemical Dictionary* 11th Edition, by Sax and Lewis, Van Nostrand Reinhold, New York, N.Y., 1987; and *The Merck Index*, 11th Edition, Merck & Co., Rahway N.J. 1989.

As used herein "alkyl" includes a saturated linear, branched, or cyclic hydrocarbon radical. In one embodiment, alkyl has from 1 to 200 carbon atoms. In another embodiment, alkyl has from 1 to 50 carbon atoms. In another embodiment, alkyl has from 1 to 30 carbon atoms. In another embodiment, alkyl has 5-15 carbon atoms. The alkyl group may optionally be substituted with one or more substituents such as fluorine, chlorine, alkyl groups having from 1 to 10 carbon atoms (e.g., methyl or ethyl), alkoxy groups having from 1 to 10 carbon atoms (e.g., methoxy or ethoxy), alkoxyalkyl groups having from 1 to 10 carbon atoms and one or more oxygen atoms, or amido groups having from 1 to 10 carbon atoms, such as acetamido. These substituents may themselves be substituted with one or more functional groups such as hydroxy groups, carboxy groups, acetoxy groups, or halogens.

As used herein "aryl" means a mono- or poly-nuclear aromatic hydrocarbon radical. Examples of "aryl" groups include, but are not limited to aromatic hydrocarbons such as a phenyl group or a naphthyl group for example. The aromatic group may optionally be substituted with one or more substituents such as fluorine, chlorine, alkyl groups having from 1 to 10 carbon atoms (e.g., methyl or ethyl), alkoxy groups having from 1 to 10 carbon atoms (e.g., methoxy or ethoxy), alkoxyalkyl groups having from 1 to 10 carbon atoms and one or more oxygen atoms, or amido groups having from 1 to 10 carbon atoms, such as acetamido. These substituents may themselves be substituted with one or more functional groups such as hydroxy groups, carboxy groups, acetoxy groups, or halogens.

In one embodiment, aryl is a phenyl group or a naphthyl group that are either unsubstituted or substituted.

As used herein "cycloalkyl" includes cyclopropyl, cyclobutyl, cyclopentyl, cyclohexyl, cycloheptyl, cyclooctyl, and the like. The cycloalkyl group may optionally be substituted with one or more substituents such as fluorine, chlorine, alkyl groups having from 1 to 10 carbon atoms (e.g., methyl or ethyl), alkoxy groups having from 1 to 10 carbon atoms (e.g., methoxy or ethoxy), alkoxyalkyl groups having from 1 to 10 carbon atoms and one or more oxygen atoms, or amido groups having from 1 to 10 carbon atoms, such as acetamido. These substituents may themselves be substituted with one or more functional groups such as hydroxy groups, carboxy groups, acetoxy groups, or halogens.

As used herein, "heterocycle" means a mono- or poly-nuclear saturated or unsaturated cyclic radical containing carbons and one or more heteroatoms such as nitrogen, oxygen, phosphorus, silicon, or sulfur or a combination thereof in the ring or rings. In another embodiment, a heterocycle includes mono- or poly-nuclear saturated or unsaturated cyclic radicals containing carbons and one or more heteroatoms such as nitrogen, oxygen, or sulfur. This includes, but is not limited to, pyridine, pyrrol, indole, adenosine, thiazole, pyrazine, guanine, cytosine, thymine, adenine, uredine, uracil, oxazole, purine, pyrazole, hydantoin, piperazine, quinoline, xanthene, 1,10-phenanthroline, thiophene, and acridine. The heterocycle group may optionally be substituted with one or more substituents such as fluorine, chlorine, alkyl groups having from 1 to 10 carbon atoms (e.g., methyl or ethyl), alkoxy groups having from 1 to 10 carbon atoms (e.g., methoxy or ethoxy), alkoxyalkyl groups having from 1 to 10 carbon atoms and one or more oxygen atoms, or amido groups having from 1 to 10 carbon atoms, such as acetamido. These substituents may themselves be substituted with one or more functional groups such as hydroxy groups, carboxy groups, acetoxy groups, or halogens.

The alkyl, aryl, cycloalkyl, and heterocycle groups can also be substituted with one or more of the substituents listed herein below. As used herein, the term "substituted" is intended to indicate that one or more (e.g., 1, 2, 3, 4, or 5; in some embodiments 1, 2, or 3; and in other embodiments 1 or 2) hydrogen atoms on the group indicated in the expression using "substituted" is replaced with a selection from the indicated organic or inorganic group(s), or with a suitable organic or inorganic group known to those of skill in the art, provided that the indicated atom's normal valency is not exceeded, and that the substitution results in a stable compound. Suitable indicated organic or inorganic groups include, e.g., alkyl, alkenyl, alkynyl, alkoxy, halo, haloalkyl, hydroxy, hydroxyalkyl, aryl, heteroaryl, heterocycle, cycloalkyl, alkanoyl, alkoxycarbonyl, amino, alkylamino, dialkylamino, trifluoromethylthio, difluoromethyl, acylamino, nitro, trifluoromethyl, trifluoromethoxy, carboxy, carboxyalkyl, keto, thioxo, alkylthio, alkylsulfinyl, alkylsulfonyl, alkylsilyl, and cyano. Additionally, the suitable indicated groups can include, e.g., —X, —R, —O$^-$, —OR, —SR, —S—, —NR$_2$, —NR$_3$, =NR, —CX$_3$, —CN, —OCN, —SCN, —N=C=O, —NCS, —NO, —NO$_2$, =N$_2$, —N$_3$, NC(=O)R, —C(=O)R, —C(=O)NRR —S(=O)$_2$O$^-$, —S(=O)$_2$OH, —S(=O)$_2$R, —OS(=O)$_2$OR, —S(=O)$_2$NR, —S(=O)R, —OP(=O)O$_2$RR, —P(=O)O$_2$RR—P(=O)(O$^-$)$_2$, —P(=O)(OH)$_2$, —C(=O)R, —C(=O)X, —C(S)R, —C(O)OR, —C(O)O$^-$, —C(S)OR, —C(O)SR, —C(S)SR, —C(O)NRR, —C(S)NRR, —C(NR)NRR, where each X is independently a halogen (or "halo" group): F, Cl, Br, or I; and each R is independently H, alkyl, aryl, heterocycle, protecting group or prodrug moiety. As would be readily understood by one skilled in the art, when a substituent is keto (i.e., =O) or thioxo (i.e., =S), or the like, then two hydrogen atoms on the substituted atom are replaced.

The term "alkylthio" refers to the group alkyl-S—, where alkyl is as defined herein. In one embodiment, alkylthio groups include, e.g., methylthio, ethylthio, n-propylthio, isopropylthio, n-butylthio, tert-butylthio, sec-butylthio, n-pentylthio, n-hexylthio, 1,2-dimethylbutylthio, and the like. The alkyl group of the alkylthio can be unsubstituted or substituted.

The term "alkylsilyl" refers to the group alkyl-SiH$_2$— or alkyl-SiR$_2$—, where alkyl is as defined herein, and each R is independently H or alkyl. Thiophenes can be substituted by alkylsilyl groups by any of the many techniques known to those of skill in the art, typically by coupling the thiophene with an alkylsilyl halide, many of which are disclosed in the Aldrich Handbook of Fine Chemicals, 2003-2004, Milwaukee, Wis.

As to any of the above groups, which contain one or more substituents, it is understood, of course, that such groups do not contain any substitution or substitution patterns that are sterically impractical and/or synthetically non-feasible. In addition, the compounds of this invention include all stereochemical isomers arising from the substitution of these compounds.

As used herein "alkali metal" includes lithium (Li+), sodium (Na+), potassium (K+), rubidium (Rb+), and cesium (Cs+). In one embodiment, the alkali metal is sodium (Na+), or potassium (K+). In another embodiment, the alkali metal is sodium (Na+).

As used herein, the term "halo" refers to a fluoro, chloro, bromo, or iodo group, substituent, or radical.

In one embodiment, n is an integer from 0 to 50. In another embodiment, n is an integer from 1 to 30. In a further embodiment, n is 5-15.

In one embodiment, only $R_1$ or $R_2$ is one of alkyl, -alkylCO$_2$H, aryl, —(CH$_2$)$_n$-aryl-(CH$_2$)$_n$—CO$_2$H, heterocycle, —(CH$_2$)$_n$-heterocycle-(CH$_2$)$_n$CO$_2$H, cycloalkyl, or —(CH$_2$)$_n$-cycloalkyl-(CH$_2$)$_n$CO$_2$H.

In one embodiment, the polymer is regioselective (regioregular). Regioselective polymers are those that have all head-head, or head-tail orientations. Regiorandom are polymers with an equal amount of each orientation (25% head-tail & head-tail, 25% head-tail & head-head, 25% tail-tail & head-tail, 25% tail-tail & head-head). For further description and discussion of regiorandom and regioselective (or regioregular) see U.S. Pat. No. 5,756,653, the disclosure of which is incorporated by reference herein. In an embodiment where neither $R_1$ or $R_2$ are —H, the polymer will be neither regiorandom nor regioregular.

In one embodiment a regioregular polymer where $R_2$ is hexyl and $R_1$ is hydrogen is prepared by the process of the invention. In another embodiment, a regioregular polymer where $R_2$ is hexyl-CO$_2$H and $R_1$ is hydrogen is prepared by the process of the invention. The carboxylic acid group can be optionally converted to a sodium or potassium salt of the polymer in another embodiment.

The present process first proceeds by combining the substituted thiophene having at least two stable leaving groups with an organomagnesium halide. In one embodiment, an organomagnesium chloride is used. In the same reaction vessel following the addition of the organomagnesium chloride, zinc chloride or bromide is added and the reaction mixture allowed to come to room temperature, if below at the time of addition. In one embodiment, zinc chloride is used. (Room temperature may vary from about 18° C. to about 30° C., and is typically about 21° C. to about 25° C., or about 23° C.). The mixture is allowed to stir for less than an hour before adding the resulting clear solution to the Ni(II) catalyst to initiate polymerization, also at room temperature, in the same solvent.

The solvent is an inert solvent and, in one embodiment, an ether solvent, and in a particular embodiment, tetrahydrofuran (THF). Other ethereal solvents may be used such as diethyl ether, methyl t-butyl ether, or dioxane.

The at least two stable leaving groups can either be anionic or neutral leaving groups. Examples of anionic or neutral leaving groups include a halide, tosylate, triflate, phenolate, brosylate, trialkyl amine, triaryl amine, mixed tri(alkyl/aryl) amine, trialkyl phosphine, triaryl phosphine, mixed tri(alkyl/aryl)phosphine, trialkyl stannane, triaryl stannane, mixed tri(alkyl/aryl)stannane, thiophene (—SC$_6$H$_5$), phenolate (—OC$_6$H$_5$), and the like. By "mixed tri(alkyl/aryl)" amine, phosphine, stannane, it is meant that the nitrogen, phosphorus, and tin can be substituted with both alkyl and aryl groups. For example, a neutral leaving group can be P(CH$_3$)$_2$(C$_6$H$_5$). In one embodiment, an anionic leaving group is a halide or triflate. In another embodiment, an ionic leaving group is a halide. In a particular embodiment, an ionic leaving group is bromide.

The substituted zinc thiophenes form polymers in the presence of an effective amount of a catalyst. In one embodiment, the catalyst is a Ni(II) catalyst. By an "effective amount" of Ni(II) catalyst, it is meant that there is a sufficient amount present to effect the reaction in less than about 5 days. Typically, this is an amount of about 1-10 mole-%, and in one embodiment about 1-5 mole-%, based on the amount of organozinc present.

Examples of suitable Ni(II) catalysts include, but are not limited to Ni(PR$_3$)$_2$X$_2$ wherein R=C$_1$-C$_{300}$ alkyl, C$_6$-C$_{100}$ aryl, and X=F, Cl, Br, or I; NiLX$_2$ wherein L=1,2-bis(diphenylphosphino)ethane (Ni(dppe)), 1,3-bis(diphenyl-phosphino) propane (Ni(dppp)), [2,2-dimethyl-1,3-dioxolane-4,5-diyl)bis-(methylene)] diphenylphosphine, and X=F, Cl, Br, or I; Ni(CN)$_{4-2}$; NiO; Ni(CN)$_5^{-3}$; Ni$_2$Cl$_8^{-4}$; NiCl$_2$; NiF$_2$; NiBr$_2$; NiI$_2$; NiAs; Ni(dmph)$_2$ wherein dmph=dimethyl-glyoximate; BaNiS; [NiX(QAS)]+wherein X=F, Cl, Br, or I and QAS=As(o-C$_6$H$_4$AsPh$_2$)$_3$; [NiP(CH$_2$CH$_2$CH$_2$AsMe$_2$)$_3$CN]$^+$; [Ni(NCS)$_6$]1; KNiX$_3$ wherein X=F, Cl, Br, or I; [Ni(NH$_3$)$_6$]$^{+2}$; [Ni(bipy)$_3$]$^{+2}$ wherein bipy=bipyridene. Particularly useful are the Ni(dppe)Cl$_2$ and Ni(dppp)Cl$_2$ catalysts.

Once the polymerization has been accomplished, if the substituted polythiophene contains a free terminal carboxylic acid substituent, the next step of the process of the invention includes combination of an effective amount of an alkali metal base with the mixture to form the alkali metal salt of the polymer. It is the alkali metal salt of the polymer that is water-soluble.

Methods of the invention can utilize any alkali metal base known to those of skill in the art, including, but not limited to, lithium hydroxide (LiOH), sodium hydroxide (NaOH), potassium hydroxide (KOH), rubidium hydroxide (RbOH), and cesium hydroxide (CsOH). In one embodiment, NaOH or KOH are utilized. In another embodiment, NaOH is utilized.

Alkali metal bases are combined with the mixture in an "effective amount". As used herein, an "effective amount" means an amount capable of converting at least about 5% of the polymer to the alkali metal salt of the polymer. In one embodiment, an "effective amount" of the alkali metal base is an amount capable of converting at least about 75% of the polymer to the alkali metal salt of the polymer.

In another embodiment, an effective amount of the alkali metal base is an amount capable of converting at least about 90% of the polymer to the alkali metal salt of the polymer.

In one embodiment of the invention, the alkali metal base is added to the polymer in an amount that is a molar excess, with regard to the polymer. In another embodiment, the alkali metal base is added to the polymer in an amount that creates a molar ratio of at least about 2 to 1 (alkali metal base to polymer). In another embodiment, the alkali metal base is added to the polymer in an amount that creates a molar ratio of at least about 5 to 1 (alkali metal base to polymer).

The alkali metal based can be combined with the mixture using any method known to those of skill in the art. In one embodiment, the alkali metal base is added by forming an aqueous solution containing the alkali metal base and stirring the solution. In one embodiment, the mixture is stirred and heated as well. General techniques and methods known and used by those of ordinary skill in the art can also be utilized in methods of the invention.

The process allows for the preparation of high purity polythiophene polymers. As used herein, the term "high purity" refers to a compound or polymer that is at least about 85%, preferably at least about 87%, more preferably at least about 90%, even more preferably at least about 92%, yet more preferably at least about 95%, further preferably at least about 97%, or most preferably at least about 99% pure. The purity can be determined in a wt. %/wt. % manner.

As used herein, the term "about" means a variation of 10 percent of the value specified; for example about 50 percent carries a variation from 45 to 55 percent. For integer ranges, the term about can include one or two integers greater than and less than a recited integer.

As used herein, the terms "film" or "thin film" refers to a self-supporting or free-standing film that shows mechanical stability and flexibility, as well as a coating or layer on a supporting substrate or between two substrates.

Polymer Structure and Properties

The improved polythiophenes of the invention prepared by the methods disclosed herein can be unsubstituted, 3-substituted, or 3,4-disubstituted thiophenes. These substituents can be any of the groups recited under the definition of substituents above. In one embodiment, the thiophene is a 3-substituted thiophene, wherein the substituent is an alkyl, alkylthio, alkylsilyl, or alkoxy group. The substituent can be optionally substituted with other functional groups, for example and with out limitation, one to about five esters, ketones, nitrites, amines, halogens, aryl groups, heterocycle groups, and heteroaryl groups. The alkyl chain of the alkyl, alkylthio, alkylsilyl, or alkoxy group can also be interrupted by one or more heteroatoms, such as O, S, NP groups (wherein P is a substituent or a nitrogen protecting group), or combinations thereof.

It is often preferable to include substituents that improve the solubility of the polythiophene. Such substituents can preferably include groups that include at least about five or six carbon atoms, such as hexyl, hexoxy, hexylthio, and hexylsilyl groups. In another aspect of the invention, it can be preferable that the substituent directly attached to the 3-position is a heteroatom, such as a sulfur, silicon, oxygen, or nitrogen atom. The heteroatoms can be substituted with other appropriate groups, such as are described above in the definition of substituted. Heteroatoms at the 3-position of the thiophenes can further enhance the conductivity of the polythiophene by, for example, allowing for delocalization of the aromatic electrons of the thiophene ring systems and/or allowing for improved packing and optimized microstructure of the polymer, leading to improved charge carrier mobility. In a further aspect of the invention, it can be preferable to separate an aryl, heteroaryl, or heterocycle substituent from the thiophene ring by one or more (e.g., one to ten, one to five, or one to three) methylene groups, optionally interrupted by one or more heteroatoms (e.g., a polyethylene or polyethyleneimine group wherein the group includes about 2 to about 10 repeating units. Substituents at the 3-position of the thiophene monomer can improve the regioregularity of the product polythiophene by providing steric bulk that influences the regiochemistry of the polymerization.

The terminal groups (group at the 2- or 5-position of the terminal thiophene of the polymer) on the product polythiophene can be a hydrogen or a halogen. The terminal group of the polythiophene can also be an alkyl or functionalized alkyl group, which can be provided for by quenching the polymerization with an organometallic species, such as an organo-zinc reagent.

The average weight molecular weight of the polythiophenes prepared by the methods described herein can be about 10,000 to about 150,000, preferably about 20,000 to about 80,000, and more preferably about 40,000 to about 60,000, as determined by GPC using a polystyrene standard in THF. The polydispersity index (PDI) can be about 1.1 to about 2, preferably about 1.10 to about 1.8, and more preferably about 1.15 to about 1.6.

The crude polythiophene can be isolated after polymerization by precipitation in methanol followed by simple filtration of the precipitated polymer. The crude polymer has superior properties relative to the crude products of the art. The crude polythiophene of the invention has higher regioregularity that the known preparatory methods, which reduces the amount of purification necessary to provide a usable material for electronic applications.

Higher regioregularity results in higher conductivity of the polythiophenes. When doped, a regioregular 3-substituted polythiophene can have a conductivity of about 1,000 seimens/cm, +/− about 400 seimens/cm. Regiorandom 3-substituted polythiophenes are typically conduct at only about 5-10 seimens/cm. Furthermore, undoped regioregular 3-substituted polythiophenes conduct at about $10^{-5}$ to about $10^{-6}$ seimens/cm (the semiconductor range), and undoped regiorandom polythiophenes conduct at about $10^{-9}$ seimens/cm.

Polythiophenes can be oxidatively or reductively doped. Dopants that can be included in the polythiophene polymer matrix include typical dopants used with conductive organic polymers, including iodine ($I_2$), bromine ($Br_2$), ferric chloride, and various arsenate or antimony salts. Other dopants include various known onium salts, iodonium salts, borate salts, tosylate salts, triflate salts and sulfonyloxyimides. The polythiophenes of the invention can be doped by dissolving the polymer in a suitable organic solvent and adding the dopant to the solution, followed by evaporation of the solvent. Many variations of this technique can be employed and such techniques are well known to those of skill in the art. See for example, U.S. Pat. No. 5,198,153.

The polymers of the invention can also include one or more other suitable components such as, for example, sensitizers, stabilizers, inhibitors, chain-transfer agents, co-reacting monomers or oligomers, surface active compounds, lubricating agents, wetting agents, dispersing agents, hydrophobing agents, adhesive agents, flow improvers, diluents, colorants, dyes, pigments, or dopants. These optional components can be added to a polymer composition by dissolving the polythiophene in a suitable organic solvent and adding the component to the solution, followed by evaporation of the solvent. In certain embodiments of the invention, the polythiophene polymers are significantly useful as substantially pure polymers or as a doped polymers.

Thin Films

The high purity polymers prepared by the methods described herein can be used to form thin films. The thin films can be formed using standard methods known to those of skill in the art, such as spin coating, casting, dipping, bar coating, roll coating, and the like, using a solution of a polythiophene of the invention dissolved in a solvent. See for example U.S. Pat. Nos. 5,892,244; 6,337,102; 7,049,631; 7,037,767; 7,025,277; 7,053,401; and 7,057,339 for methods of preparing thin films and organic field effect transistors. The thin films can have a wide range of thickness. A typical thin film is in the range of about 1 µm to about 1 mm. The thin film can include a coloring agent, a plasticizer, or a dopant. The polythiophenes of the invention can be electrically conductive, particularly when a dopant is included in the polymer matrix.

Applications of the Regioregular Polythiophenes

The regioregular polythiophenes can be employed in the manufacture of organic light-emitting diodes (OLEDs). The OLEDs can be used in electronic displays. The regioregular polythiophenes can also be used to prepare radio frequency identification (REID) tags. Regioregular poly(3-alkylthiothiophenes) are especially useful for preparing thin films and organic field effect transistors (OFETs). The polythiophenes can further be used in, for example, optical, electrooptical, electric, electronic, charge transport, electroluminescent, or photoconductor materials, applications, and devises. Other applications include photovoltaic devises and plastic lighting. Further applications include their use in liquid crystal and/or semiconducting materials, devices, or applications. The increased conductance of these polymers compared to conventional syntheses allows for improved conductance, and therefore, improved function of these applications and devices.

The invention further relates to the polymers described herein in electrooptical displays, OLCDs, ELCDs, optical films, reflective films, electronic devices such as OFETs as components of integrated circuits, thin film transistors in flat or flexible panel display applications or for RFID tags, semiconducting or light-emitting components of organic light emitting diodes (OLED) applications, electroluminescent displays or backlights of LCDs, electrode materials in batteries, and the like.

The regioregular polythiophenes are particularly useful for use in plastic electronics, such as for preparing plastic RFID tags, plastic photovoltaic devices, plastic lighting devices, and OLEDs. Accordingly, the invention provides an electronic device comprising a circuit constructed with a polymer as described herein, such as a polymer prepared as described in Example 1.

The following Example is intended to illustrate the above invention and should not be construed as to narrow its scope. One skilled in the art will readily recognize that the Example suggests many other ways in which the present invention could be practiced. It should be understood that many variations and modifications may be made while remaining within the scope of the invention.

EXAMPLES

Example 1

Preparation of Regioregular HT Poly(3-hexylthiophene) from 2,5-Dibromo-3-hexylthiophene and Alkyl Grignard in the Presence of Zinc Chloride In a 250 mL of round-bottom-flask, 2,5-dibromo-3-hexylthiophene (8.15 g, 25 mmol) was placed and 50 mL of THF was added. Then, the reaction flask was cooled down in an ice-bath. With being stirred at 0° C., cyclohexylmagnesium chloride (2.0M in ether, 12.5 mL, 25 mmol) was slowly added. After being stirred at 0° C. for 10 minutes, zinc chloride (0.5M in THF, 50 mL, 25 mmol) was added into the reaction mixture and allowed to warm up room temperature over 20 minutes. The resulting clear solution was added via a cannula into the flask containing Ni(dppe)Cl$_2$ (0.08 g, 0.6 mol %) at room temperature. The mixture was stirred for 24 hours at room temperature. A dark-purple precipitate was formed gradually in this period. The mixture was poured into a solution of MeOH (100 mL) and 3 N HCl (10 mL). The resulting dark precipitate was filtered and washed with MeOH, and then dried under high vacuum. Soxhlation with hexanes gave 2.87 g of dark polymer of regioregular HT poly(3-hexylthiophene) (69% yield).

$^1$H NMR (300 MHz); 6.98 (s, 1H) for HT-HT linkage, 2.80 (t, 2H) for HT linkage (less than 4% intensity for HH linkage in this α-position region at δ2.58 was also observed), 1.72

(pent, 2H), 1.44 (m, 2H), 1.35 (m, 4H), 0.92 (t, 3H); $^{13}$C NMR (125 MHz) 139.9, 133.7, 130.5, 128.6, 31.7, 30.5, 29.5, 22.6, 14.1. The NMR analysis indicates the polymer to be 96% regioregular and 4% regiorandom.

Example 2

Exemplary poly(3-substituted-thiophenes)

Scheme 1 illustrates several of the polythiophenes that can be prepared by the methods described herein, wherein n is a value such that the polythiophene polymer as a molecular weight of about 10,000 to about 200,000; "Hex" is hexyl but can be any alkyl group as described herein; "Bn" is benzyl which can be optionally substituted as described herein; "Ar" is aryl as described herein; "Het" is heteroaryl or heterocycle as described herein; m is 1 to about 20; and R is alkyl as described herein.

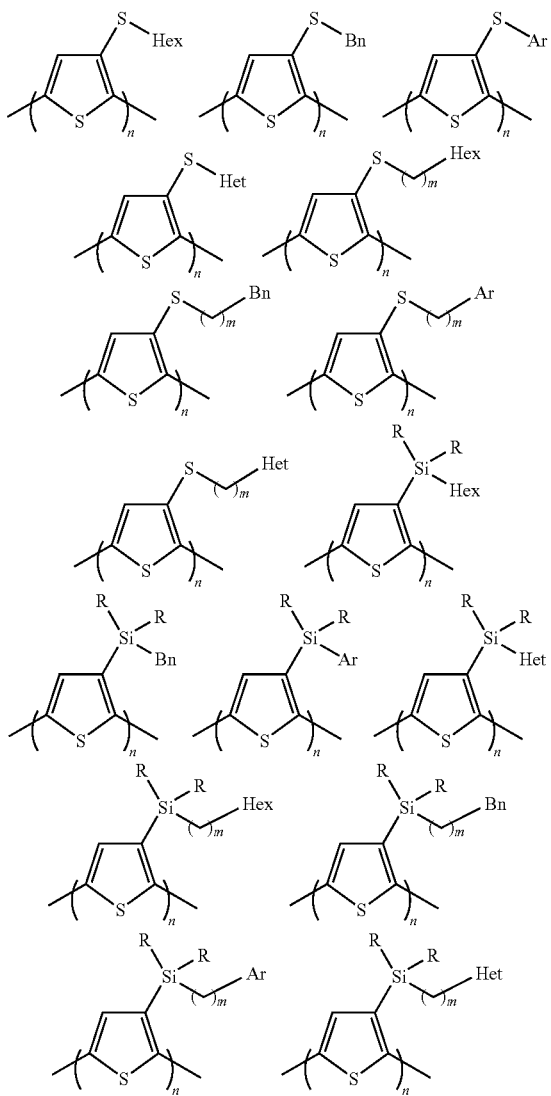

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A process for preparing a poly(3-substituted)thiophene comprising:
   an organomagnesium halide and a 3-substituted thiophene having at least two leaving groups;
   contacting zinc chloride or zinc bromide and a reaction mixture formed from the organomagnesium halide and the 3-substituted thiophene having at least two leaving groups to produce a second reaction mixture; and
   contacting the second reaction mixture and a Ni(II) catalyst to produce the poly-(3-substituted)thiophene having greater than about 95% regioregularity.

2. The process of claim 1, wherein the organomagnesium halide is in a solvent that does not quench an organomagnesium halide reagent at room temperature.

3. The process of claim 2, wherein the organomagnesium halide and the 3-substituted thiophene are allowed to react at about 0° C. to about room temperature.

4. The process of claim 3, wherein the second reaction mixture and the Ni(II) catalyst are contacted in the presence of a solvent that does not quench an organomagnesium halide reagent at about room temperature.

5. The process of claim 4, wherein the second reaction mixture and the Ni(II) catalyst are contacted at about room temperature.

6. A process for preparing a polymer of the formula:

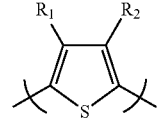

wherein $R_1$ and $R_2$ are each independently —H, -alkyl, -aryl, -heterocycle, -cycloalkyl, -alkyl-CO$_2$H, —(CH$_2$)$_n$-aryl-(CH$_2$)$_n$—CO$_2$H, —(CH$_2$)$_n$-heterocycle-(CH$_2$)$_n$CO$_2$H, or —(CH$_2$)$_n$-cycloalkyl-(CH$_2$)$_n$—CO$_2$H, where n is an integer from 0 to 200, and with the proviso that no more than one of $R_1$ and $R_2$ is —H, comprising:
a compound of the formula:

wherein $R_1$ and $R_2$ are as defined above, and an organomagnesium reagent of the formula R'MgX where X is F, Cl, Br or I, and R' is alkyl or aryl;
contacting zinc chloride or zinc bromide and a reaction mixture formed from the compound of the formula:

wherein $R_1$ and $R_2$ are as defined above, and the organomagnesium reagent of the formula R'MgX where X is F, Cl, Br or I, and R' is alkyl or aryl to produce a second reaction mixture; and contacting the second reaction mixture and a Ni(II) catalyst to produce the poly-(3-substituted)thiophene having greater than about 95% regioregularity.

7. The process of claim 6, wherein the organomagnesium reagent is in a solvent that does not quench an organomagnesium halide reagent at room temperature.

8. The process of claim 7, wherein the organomagnesium reagent and the substituted thiophene are allowed to react at about 0° C. to about room temperature.

9. The process of claim 8, wherein the second reaction mixture and the Ni(II) catalyst are contacted in the presence of a solvent that does not quench an organomagnesium halide reagent at about room temperature.

10. The process of claim 9, wherein the second reaction mixture and the Ni(II) catalyst are contacted at about room temperature.

11. The process of claim 6, wherein the solvent is an ether solvent.

12. The process of claim 6, wherein the solvent is tetrahydrofuran.

13. The process of claim 6, wherein X is Cl and zinc chloride is used.

14. The process of claim 6, wherein $R_1$ and $R_2$ are each independently —H, alkyl-, -alkyl-$CO_2H$, —$(CH_2)_n$-aryl-$(CH_2)_n$—$CO_2H$, —$(CH_2)_n$-heterocycle-$(C_2)_n$—$CO_2H$, or —$(CH_2)_n$-cycloalkyl-$(CH_2)_n$—$CO_2H$, which further comprises adding an effective amount of an alkali metal base to form an alkali metal salt of said polymer.

15. The process of claim 14, wherein $R_1$ is —H and $R_2$ is -alkyl or -alkyl-$CO_2H$.

16. The process of claim 15, wherein alkyl or alkyl-$CO_2H$ has about 1 to about 30 carbon atoms.

17. The process of claim 16, wherein alkyl-$CO_2H$ is hexyl-$CO_2H$.

18. An electroconductive water-soluble thin film comprising a water-soluble alkali metal salt of a polythiophene polymer having a terminal carboxylic acid group substituted on the polythiophene polymer prepared by the process of claim 6, said process further comprising adding an effective amount of an alkali metal base to form the alkali metal salt of said polymer.

19. An electronic component that includes an organic thin film transistor or an organic light emitting diode comprising a water-soluble alkali metal salt of a polythiophene polymer having a terminal carboxylic acid group substituted on the polythiophene polymer prepared by the process of claim 6, said process further comprising adding an effective amount of an alkali metal base to form an alkali metal salt of said polymer.

20. The electronic component of claim 19, wherein the water-soluble polymer is a regioregular polymer.

21. The process of claim 1, wherein the thiophene is a 3-substituted thiophene;

wherein the substituent is an alkyl, alkylthio, alkylsilyl, or alkoxy group, optionally substituted with one to about five esters, ketones, nitriles, amines, halogens, aryl groups, heterocycle groups, and heteroaryl groups; and wherein the alkyl chain of the alkyl, alkylthio, alkylsilyl, or alkoxy group is optionally interrupted by one or more heteroatoms.

* * * * *

UNITED STATES PATENT AND TRADEMARK OFFICE
CERTIFICATE OF CORRECTION

PATENT NO. : 7,572,880 B2  Page 1 of 1
APPLICATION NO. : 12/009637
DATED : August 11, 2009
INVENTOR(S) : Rieke It is certified that error appears in the above-identified patent and that said Letters Patent is hereby corrected as shown below:

In column 5, line 33, delete "—S—," and insert -- —S⁻, --, therefor.

In column 7, line 13, delete "R==" and insert -- R= --, therefor.

In column 7, line 14, delete "X==" and insert -- X= --, therefor.

In column 7, line 17, delete "X—" and insert -- X= --, therefor.

In column 7, line 18, delete "Ni(CN)$_{4-2}$;" and insert -- Ni(CN)$_4^{-2}$; --, therefor.

In column 7, line 20, delete "[NiX(QAS)]+" and insert -- [NiX(QAS)]$^+$ --, therefor.

In column 7, line 20, delete "X==" and insert -- X= --, therefor.

In column 7, line 22, delete "X==" and insert -- X= --, therefor.

In column 8, line 24, delete "nitrites," and insert -- nitriles, --, therefor.

In column 10, line 1, delete "(REID)" and insert -- (RFID) --, therefor.

In column 13, line 30, in Claim 14, delete "(C$_2$)$_n$" and insert -- (CH$_2$)$_n$ --, therefor.

Signed and Sealed this

Sixth Day of October, 2009

David J. Kappos
*Director of the United States Patent and Trademark Office*